US011741101B2

(12) United States Patent
Wang et al.

(10) Patent No.: US 11,741,101 B2
(45) Date of Patent: Aug. 29, 2023

(54) ESTIMATING EXECUTION TIME FOR BATCH QUERIES

(71) Applicant: International Business Machines Corporation, Armonk, NY (US)

(72) Inventors: Xiaobo Wang, Beijing (CN); Shuo Li, Beijing (CN); Xiao Xiao Chen, Beijing (CN); Sheng Yan Sun, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 17/122,115

(22) Filed: Dec. 15, 2020

(65) Prior Publication Data

US 2022/0188315 A1 Jun. 16, 2022

(51) Int. Cl.
| | |
|---|---|
| *G06F 16/2453* | (2019.01) |
| *G06N 20/00* | (2019.01) |
| *G06F 11/34* | (2006.01) |
| *G06F 16/23* | (2019.01) |

(52) U.S. Cl.
CPC .... *G06F 16/24544* (2019.01); *G06F 11/3419* (2013.01); *G06F 16/2386* (2019.01); *G06N 20/00* (2019.01)

(58) Field of Classification Search
CPC ........... G06F 16/24544; G06F 16/2386; G06F 11/3419; G06N 20/00
See application file for complete search history.

(56) References Cited

U.S. PATENT DOCUMENTS

| | | | |
|---|---|---|---|
| 2009/0254916 A1* | 10/2009 | Bose | G06F 16/2455 718/104 |
| 2016/0140171 A1* | 5/2016 | Singhal | G06F 16/2455 707/713 |
| 2016/0188696 A1 | 6/2016 | Belghiti | |
| 2017/0161105 A1 | 6/2017 | Barrett et al. | |
| 2017/0316055 A1 | 11/2017 | Chen et al. | |
| 2018/0267806 A1* | 9/2018 | Chirayath Kuttan | G06F 9/5066 |
| 2022/0058478 A1* | 2/2022 | Kuo | G06N 3/08 |
| 2022/0092067 A1* | 3/2022 | Zhu | G06F 16/2453 |

OTHER PUBLICATIONS

Pasunuru ("Predicting Query Execution Time Using Statistical Techniques", Computer Science and Automation Indian Institute of Science Bangalore—560 012 (INDIA) Jun. 2016) (Year: 2016).*
Mell et al., "The NIST Definition of Cloud Computing", Recommendations of the National Institute of Standards and Technology, Special Publication 800-145, Sep. 2011, 7 pages.

* cited by examiner

*Primary Examiner* — Apu M Mofiz
*Assistant Examiner* — Farhad Agharahimi
(74) *Attorney, Agent, or Firm* — Daniel M. Yeates

(57) ABSTRACT

A computer-implemented method to estimate an execution time for large query batches. The method includes identifying a batch of queries, where the batch of queries where each query is configured to retrieve data from a database. Selecting a first query and generating an access path for the first query including one or more mini plans. Building a learning model for the one or more mini plans. Estimating an estimated execution time for each of the one or more mini plans. Adding each of the estimated execution times for each of the one or more mini plans to determine a first total estimated time for the first query. Displaying the first total estimated time.

19 Claims, 7 Drawing Sheets

ESTIMATING EXECUTION TIME FOR BATCH QUERIES

BACKGROUND

The present disclosure relates to database management, and, more specifically, to estimating an execution time for a batch of queries.

Modern database systems can contain relatively large amounts of data. This data can be processed, updated, retrieved, and/or otherwise used to many purposes. Queries can be used to process the data. Many systems store queries to process them as a batch, rather than on demand.

SUMMARY

Disclosed is a computer-implemented method to estimate an execution time for large query batches. The method includes identifying a batch of queries, wherein the batch of queries includes a plurality of queries and each query of the plurality of queries is configured to retrieve data from a database. The method further includes selecting a first query of the plurality of queries. The method also includes generating an access path for the first query including one or more mini plans. The method includes building a learning model for the one or more mini plans. The method also includes estimating, by the one or more mini plans, an estimated execution time for each of the one or more mini plans. The method further includes adding each of the estimated execution times for each of the one or more mini plans to determine a first total estimated time for the first query. The method also include displaying the first total query estimated time, and executing the batch of queries. Further aspects of the present disclosure are directed to a system and a computer program product containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

Figure 1:
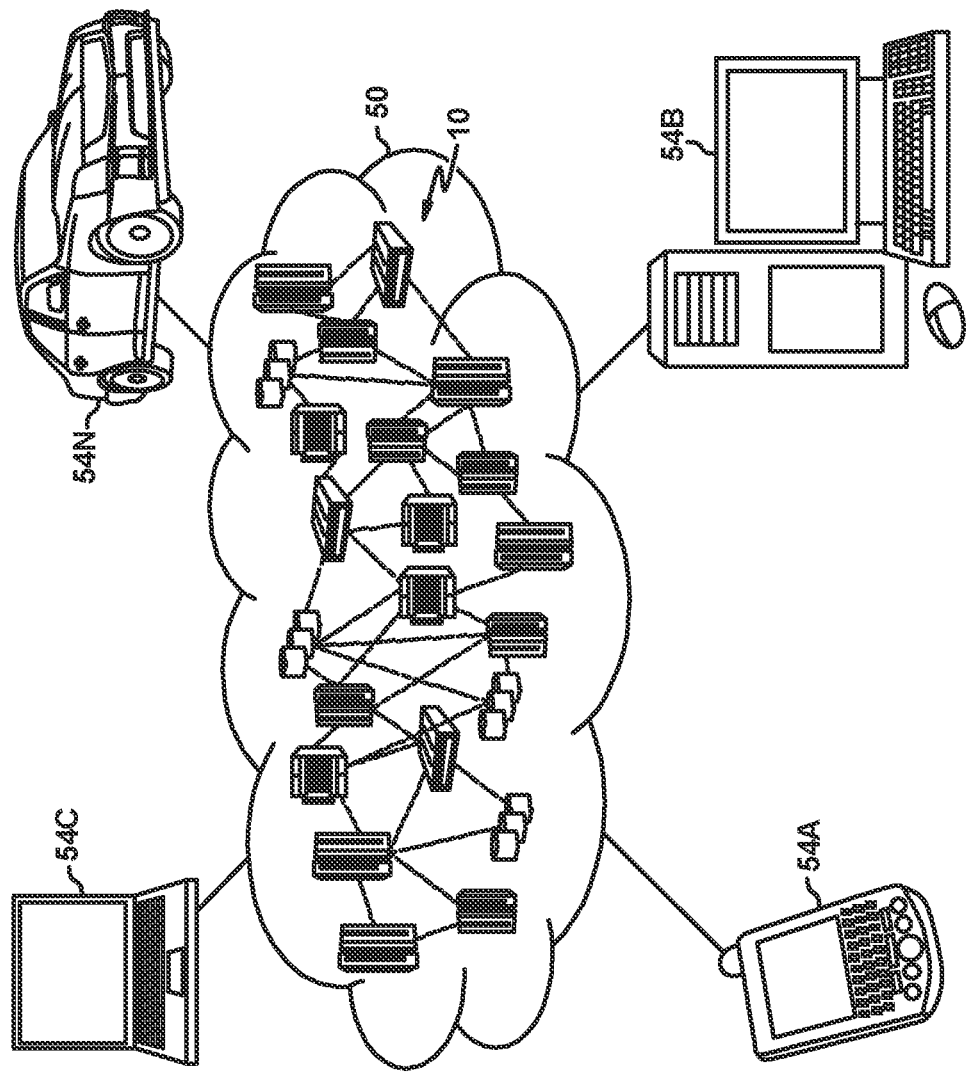
FIG. 1 depicts a cloud computing environment according to embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The present disclosure relates to database management, and, more specifically, to estimating an execution time for a batch of queries. While not limited to such applications, embodiments of the present disclosure may be better understood in light of the aforementioned context.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
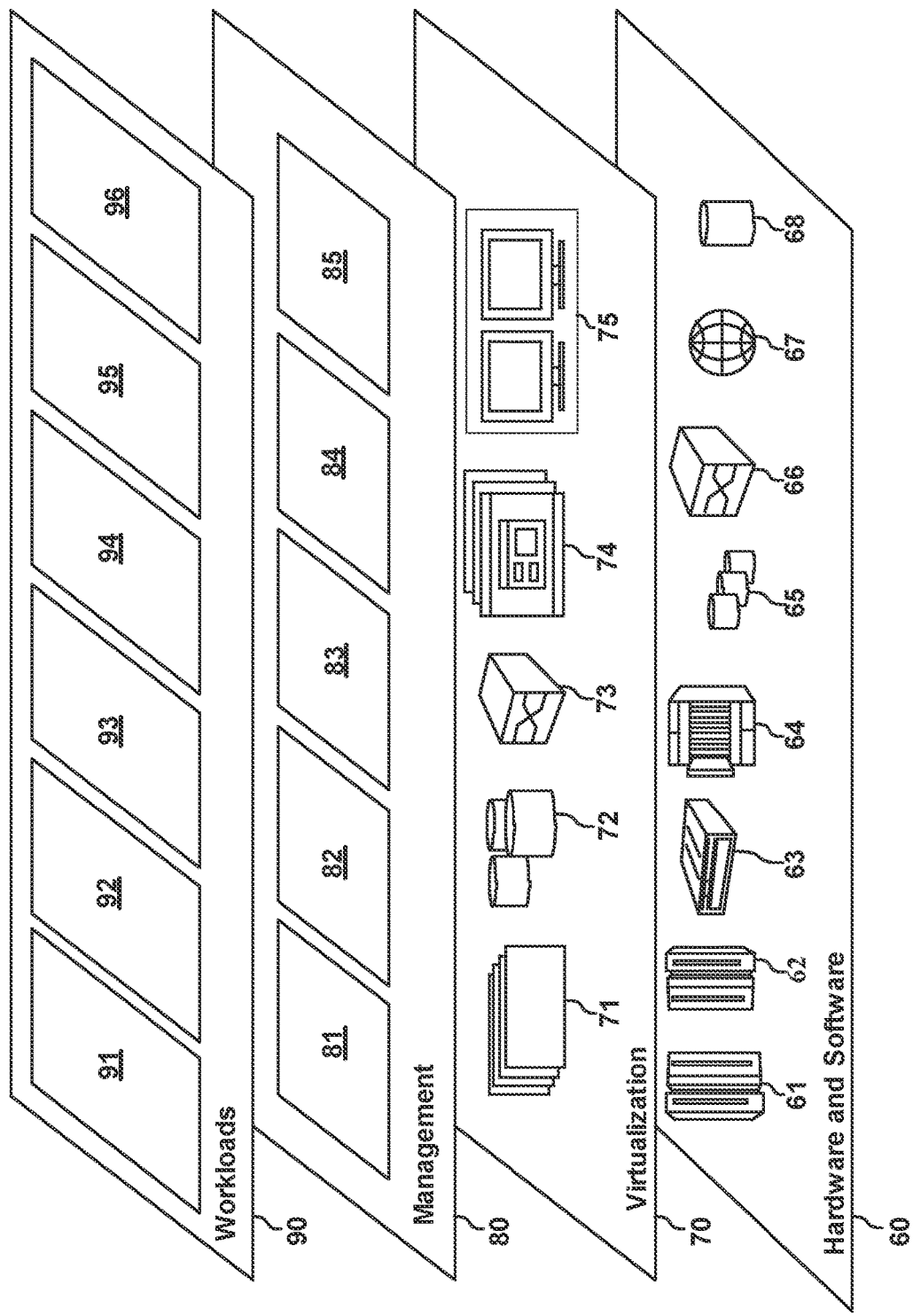
FIG. 2 depicts abstraction model layers according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query batch processing time estimation 96.

Data Processing System in General

Figure 3:
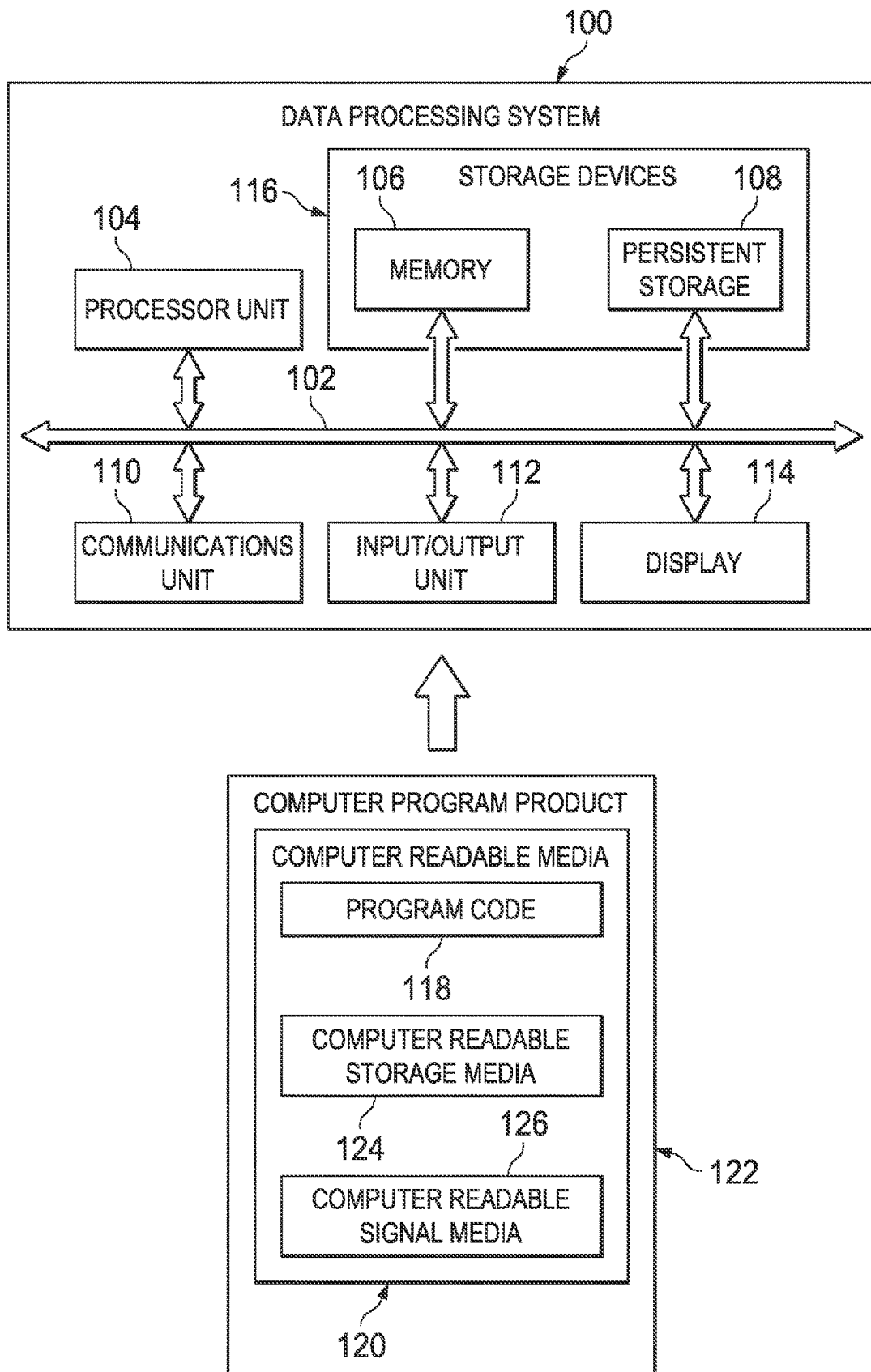
FIG. 3 is a block diagram of a DPS according to embodiments present disclosure.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Estimating Execution Time for a Batch of Queries

Modern database systems can contain relatively large amounts of data. This data can be processed, updated, retrieved, and/or otherwise used to many purposes. Queries can be used to process the data. In some embodiments, the queries use standard query language (SQL). SQL is a programming language designed for managing (storing and/or retrieving) data stored in one or more databases.

Queries can be processed as they are received (e.g., streaming, on demand, etc.). Other queries can be stored and executed in batches. Query batches (batches) can include multiple different queries from various sources (e.g., applications). Knowing and utilizing execution times for batch jobs on databases can be very important in some applications, such as banking, sales, and other transaction based industries. It can allow resource coordinators appropriately dispatch and arrange workloads in an efficient manner, and provide confidence that a workload can be processed before a threshold (e.g., processed overnight before the next work day). However, estimating batch execution time can be a difficult task. The processing time can vary based on factors such as number of queries, both total number to be processed and number of different queries (or sources), data size, breadth of queries (e.g., how many tables/databases are accesses), data distribution, system resources, query interdependencies (how a first query will affect a second query), loop/contingency logic in the queries and/or other similar factors.

Embodiments of the present disclosure can estimate a processing time of a query batch. In some embodiments, a query manager can be used to estimate the processing time. In some embodiments, the query manager can identify a query batch. The batch can include any number of queries of any number of query types from any number of sources. In some embodiments, the query manager selects a query from the batch of queries and generates an access path for the query. In some embodiments, the access path includes one or more mini plans. The number of mini plans can be consistent with the number of scan, join, and sort commands in the query. A mini plan can be a portion of an access plan. Said differently each access plan can be divided into one or more mini plans.

In some embodiments, the query manager builds one or more learning models for the query. The learning model can be configured to estimate a time to process the query. The learning model can be a nested layer model. In some embodiments, each mini plan can be associated with one or more models, or mini models. The mini models can be configured to estimate a time to perform the mini plan. The mini models can also be configured to estimate a number of qualified rows that will be included in processing the query. In some embodiments, the number of qualified rows can be an input into a different model for a different mini plan.

In some embodiments, the query manager estimates the processing time. The process can then be repeated for each query in the query batch. In some embodiments, query manager can output the estimated time.

In some embodiments, the query manager can identify query dependencies. A query dependence can include if/else statements, loops, or changes in a first query that can affect a second query. The query manager can monitor current run time data, and changes to the input data of the models to adjust/update the total estimated time.

The aforementioned advantages are example advantages, and embodiments exist that can contain all, some, or none of the aforementioned advantages while remaining within the spirit and scope of the present disclosure.

Figure 4:
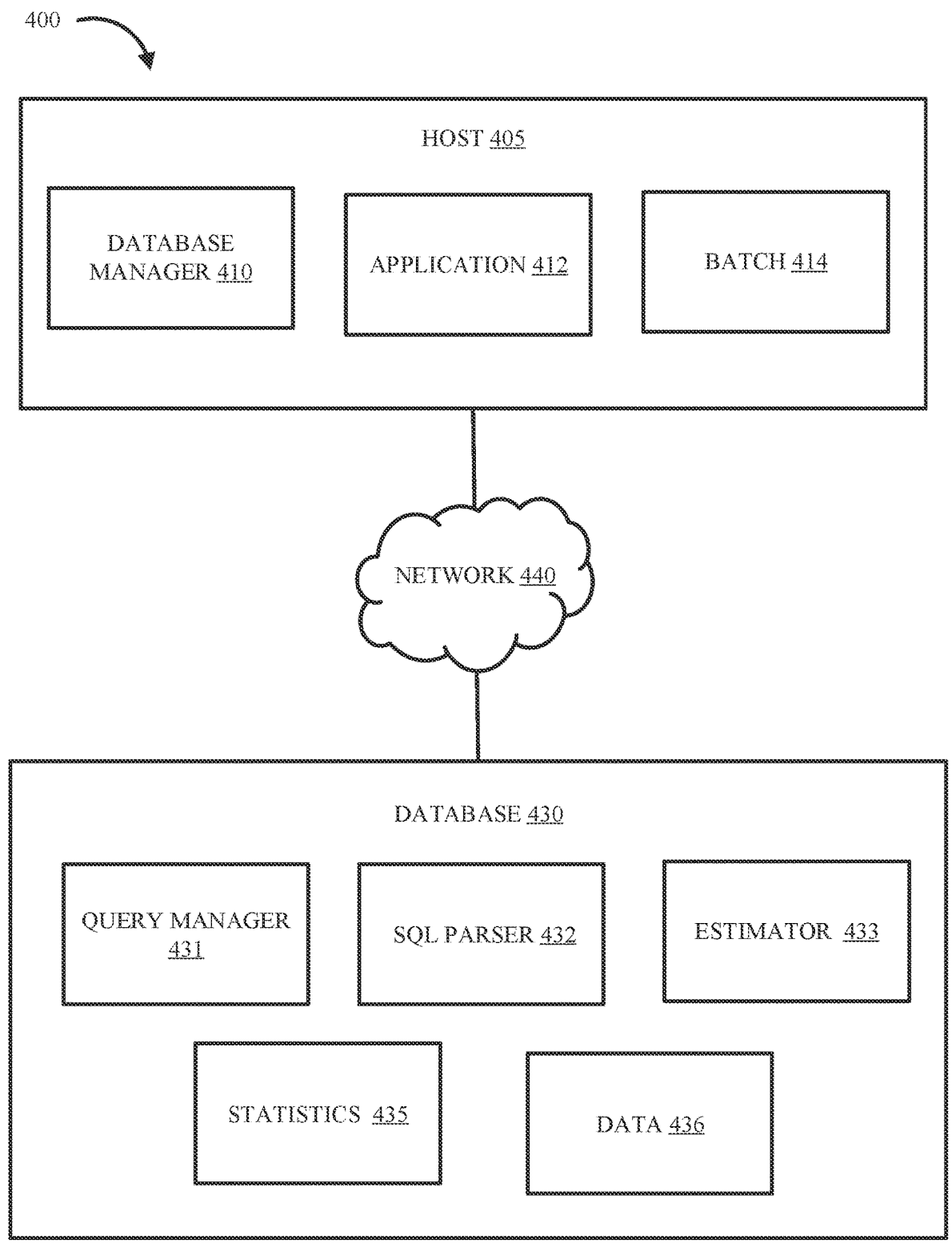
FIG. 4 is a functional diagram of a computing environment suitable for operation of a query manager according to embodiments of the present disclosure.

Referring now to various embodiments of the disclosure in more detail, FIG. 4 is a representation of a computing environment 400, that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, database 430, and other computing devices (not shown) within computing environment 400. In some embodiments, host 405, database 430, and/or the other computing devices in computing environment 400, can include a data processing system such as the data processing system 100. In some embodiments, host 405, and database 430 are included in the same computing device, however, they are shown as separate for discussion purposes.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410, and application 412.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410. In some embodiments, the queries generated by application 412 can be sent to and stored in batch 414. They can be stored until processing is commenced. In some embodiments, application 412 is included in database manager 410. In some embodiments, application 412 can generate/send two or more different queries. In some embodiments, the query is generated in SQL. In some embodiments, application 412 displays the results of the query. The results may be returned in an SQL format, and/or as images, graphs, trends, and/or other similar formats.

In some embodiments, application 412 is part of a computing device separate from host 405. The computing device may communicate with host 405 via network 440. In some embodiments, the computing device can generate queries, send queries to host 405, and/or receive and display the results of the query. In some embodiments, application 412 can include (or be considered) two or more separate applications, wherein each application is configured to generate and send queries to database 430.

In some embodiments, host 405 includes one or more applications consistent with application 412. In some embodiments, computing environment 400 includes one or more additional computing devices that include an application consistent with application 412. In some embodiments, each application can generate the same and/or different queries than application 412. In some embodiments, the queries can be added to batch 414.

Batch 414 can be any configuration of hardware and/or software configured to store a plurality of queries for batch processing. In some embodiments, the queries can be received from application 412. Batch 414 can include any number of queries of any number of types from any number of sources.

Database 430 can be any combination of hardware and/or software configured to store data in a database system. In some embodiments, database 430 is part of a federated database system. In some embodiments, database 430 includes two or more databases communicatively connected that can act as a single database. In some embodiments, database 430 may be contained within host 405. In some embodiments, database 430 can include query manager 431, SQL parser 432, estimator 433, statistics 435, and data 436.

Query manager 431 can be any combination of hardware and/or software configured to oversee execution of an SQL query. In some embodiments, query manager 431 includes one or more of SQL parser 432, estimator 433, and statistics 435. However, FIG. 4 depicts them as separate components for discussion purposes.

The SQL parser 432 can be any combination of hardware and/or software configured to determine actions to be performed from a query. In some embodiments, SQL parser 432 determines individual commands to fully execute the query (e.g., return a set of data). In some embodiments, SQL parser 432 develops an access path for the queries. The access path may include a stack (set) of commands, where each command is considered a node. In some embodiments, SQL parser 432 can include an optimizer. An optimizer can identify an access path that appears to have the least cost.

In some embodiments, SQL parser 432 can separate the access path into mini plan (query blocks). In some embodiments, each mini plan can include one fetch/retrieve (or equivalent) command. In some embodiments, the number of mini plans is consistent with the number of fetch/scan, join, sort, update, delete, and/or insert commands Estimator 433 can be any combination of hardware and/or software configured to estimate a time to process a batch of queries. In some embodiments, estimator 433 can divide the estimation into one or more sub-estimations. The sub estimations can be correlated to a mini plan, or said differently, the estimation can include combining/adding an estimation for each mini plan.

In some embodiments, estimator 433 includes one or more learning models. The learning models can be any machine learning process. In some embodiments, the learning model can be trained, by training data, to estimate processing time of the query batch. In some embodiments, estimator 433 includes a nested layer network. In some embodiments, estimator 433 includes one or more separate models for each mini plan. The models can then be nested together to build the nested layer network. In some embodiments, nested layer model can include the one or more models from each query block. The output of one query block can be an input into the model of a second query block. In some embodiments, the nesting order/nesting configuration is based on the access path generated by SQL parser 432.

In some embodiments, the one or more separate models can include a model to estimate a number of qualified rows for a query block, a model to estimate of indexed rows, and a model to predict execution time. In some embodiments, the output of a first model of the one or models can be included in the input into a second model of the one or more learning models. In some embodiments, the training data can include the same set of data as the input data, with the exception that the input will not include a time or rows. The training data for each model can include the values of the host variables (e.g., predicates, etc.) table cardinality, a column histogram, number of qualified rows, high key, low key, variance, processing time, and other similar data.

In some embodiments, estimator 433 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Statistics 435 can be any combination of hardware and/or software configured to store database statistics. In some embodiments, statistics 435 can include database statistics. In some embodiments, statistics 435 tracks distribution of values in the tables and indexes in the database (e.g., data 436). In some embodiments, statistics 435 is updated and maintained by database manager 410. In some embodiments, statistics 435 includes frequency data. Frequency data represents the relative occurrence of a given value. In some embodiments, statistics 435 includes histograms. Histograms may represent relative occurrences of a range of values. For example, an equal depth histogram can divide the data into ranges of relatively the same size. A five category/card histogram will set boundaries for each column such that about 20% of the values are in each column. If a column has a single value that include 20% of the entries, the card can be that single value, while another card can spread over a wide range of value.

In some embodiments, database statistics keeps a record of each query received. This can include the source of the query (e.g., application 412), the structure, the target data, and other similar data. In some embodiments, the common query includes data ranges queried, query efficiency, and/or query execution time. In some embodiments, queries can be organized/categorized according to a target table, a predicate (e.g., filter, target), and other similar factors.

Data 436 can be any data structure configured to store and organize data. In some embodiments, data 436 can include one or more data structures. The data structures can include tables, indices, indexes, columns, and the like. The data structures can be the target of the queries. Data 436 can include one or more separate tables and/or one or more indexes. Each table/index can include one or more columns. In some embodiments, data 436 is a target of queries.

Figure 5:
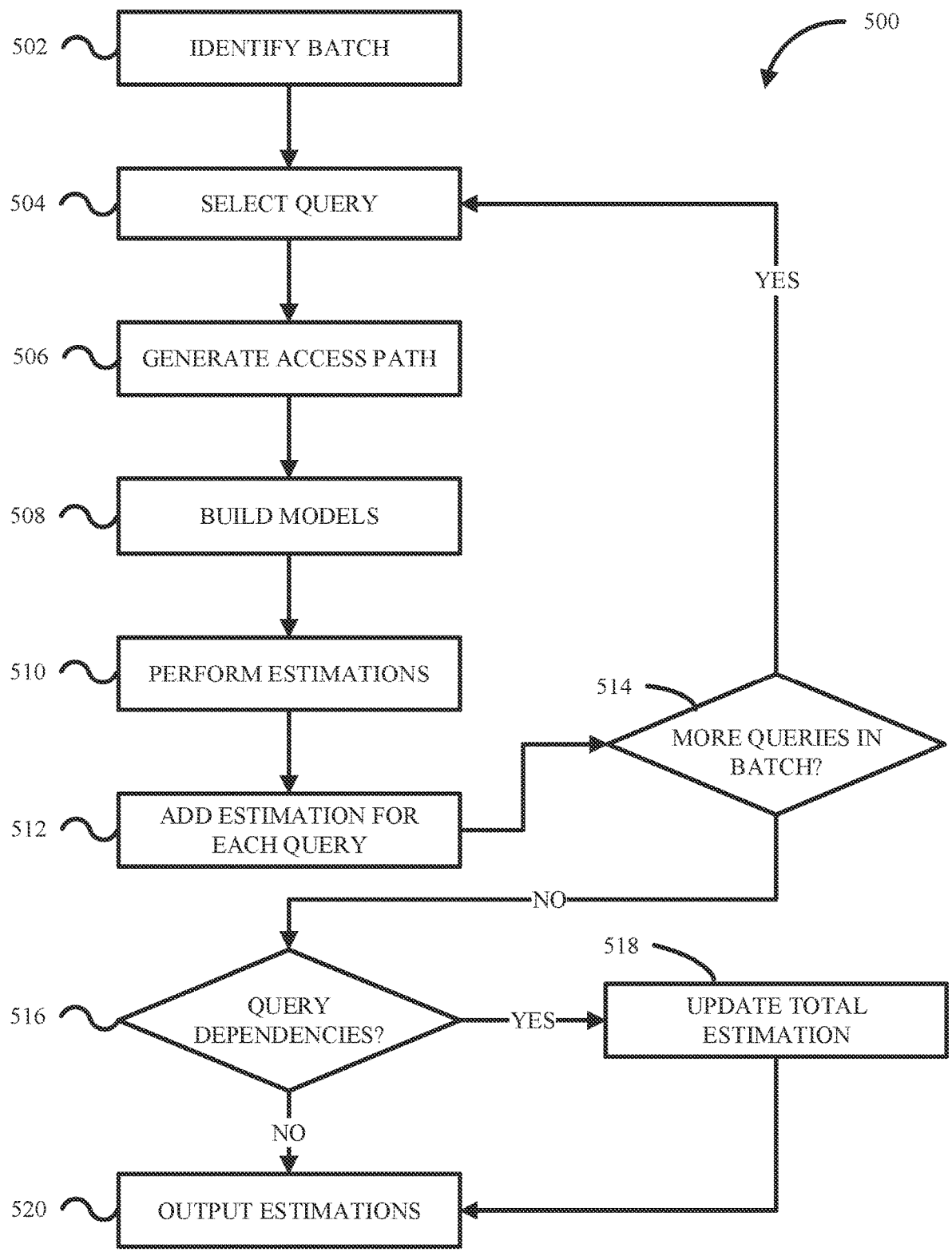
FIG. 5 is a flow chart of an example method to estimate the processing time of a query batch according to embodiments present disclosure.

FIG. 5 is a flow chart of an example method, 500, to dynamically identify a lower cost access path for a query according to embodiments of the present disclosure. The method 500 can be performed in a computing environment (e.g., computing environment 400 and/or cloud computing environment 50). One or more of the advantages and improvements described above for identifying a lower cost access path may be realized by method 500, consistent with various embodiments of the present disclosure.

Method 500 can be implemented by one or more processors, host 405, database manager 410, application 412, database 430, query manager 431, SQL parser 432, estimator 433, statistics 435, data 436, and/or a different combination of hardware and/or software. In various embodiments, the various operations of method 500 are performed by one or more of, host 405, database manager 410, application 412, database 430, query manager 431, SQL parser 432, estimator 433, statistics 435, and/or data 436. For illustrative purposes, the method 500 will be described as being performed by query manager 431.

At operation 502, query manager 411 identifies a query batch. In some embodiments, the query batch can have any number of queries from any number of sources. The queries can include multiple instances of the same query. In some embodiments, the batch is determined based on a threshold. The threshold can be a number of queries. The threshold can be based on external factors. For example, the batch can include any received over a period of time (e.g., in a 24 hour period, working day, etc.). In some embodiments, the batch can include all or some of the queries received by host 405 during the period. The batch can be stored in batch 414.

In some embodiments, the queries are received from application 412 and/or other applications. In some embodiments, the query is received in SQL. In some embodiments, the query is configured to perform one or more commands on a set of data, wherein the data is stored in database 430.

At operation 504, query manager 431 selects a query from the batch of queries. In some embodiments, query manager 431 can select any query in the query batch. In some embodiments, the selected query can be based on one or more of, query type, query size, order received, source, and/or other similar factors. The first query selected can be the first query, then next the second query and so on until the nth query.

At operation 506, query manager 431 generates an access path for the selected query. In some embodiments, the access path is generated by SQL parser 432. The access path can represent a path/order to execute the query. An example access path is discussed in further detail in FIGS. 6A-6C.

In some embodiments, query manager 431 divides the access path into one or more mini plans. In some embodiments, each mini plan can be associated with one database command. The command can be included in the access path. In some embodiments, the associated command is scan (e.g., table scan, index scan, etc.), a join (e.g., nest loop join, sort merge join, etc.), or a sort. Said differently, the number of mini plans in a query can be consistent with the number of scan, join, and sort commands in an access path.

At operation 508, query manager 431 builds/generates the leaning model. In some embodiments, the model can be configured to estimate a time to execute the batch of queries. In some embodiments, the model can be a nested layer model. In some embodiments, query manager 431 builds one or more models for each mini plan of the access path which can be called a mini model for purposes of this disclosure. The mini-models can be nested/stacked to create the full learning model. In some embodiments, the number of the one or more models for each mini plan can be based on the type of command and/or the location in the access path.

In some embodiments, a table scan command can include two models. One model can estimate the time needed to fetch the relevant data from the table. A second model can estimate the number of qualified rows. The number of qualified rows means the number of rows in the relevant column that meet the condition of the predicate in the query for the table. In some embodiments, the tables scan time model the inputs can be consistent with the training data. The inputs and training data can include the number of rows in the table, and the cardinality of the table. Cardinality represents the uniqueness of data values contained in a particular row or table. The lower the cardinality, the more duplicate elements in a column. The input data can be retrieved from the database statistics and/or real time statistics. The output of the model is a time. In some embodiments, the inputs for the qualified rows model can include one or more of values of the host variable, table cardinality, column cardinality, high key, low key, a histogram and the variance. The output can be the number of qualified rows. In some embodiments, the qualified rows model is only determined when it will be used as an input into a different model (e.g., merge).

In some embodiments, an index scan command can include three models. A first model can estimate the number of rows to be scanned by the index. The second can estimate the time needed to fetch the relevant data from the index. A third model can estimate the number of qualified rows returned. In some embodiments, the input for the first index scan module can include the values of the matching and screening host variables, a histogram, high key, a low key, and/or a variance. The output is an estimate of the number of scanned rows. In some embodiments, the second index model can be consistent with the first table scan model, except the number of rows from the first index model can be an input into the second model. The third index scan model can be consistent with the second table scan model. In some embodiments, the inputs can include the number of scanned rows, values of the predicate, histogram, high key, low key, and variance.

In some embodiments, a sort command can include one model. In some embodiments, the inputs/training data for the sort command can include sort key size, number of rows to sort, and an elapsed time. The output of the model can be an estimated time. In some embodiments, the sort model can be used across multiple queries, or said differently, the sort model is not dependent on the table/column of data being sorted. It is only dependent on the size of the data.

In some embodiments, a join command can include two models. A first model to estimate execution time of the join command. A second model to estimate the number of qualified rows. In some embodiments, each type of join command can have a unique model. For example, a sort merge join will have a different model than a nest loop join, that will be different that a hybrid join model. The training data/input of the join time model can include number of qualified rows from an outer table and an umber of qualified rows from the inner table. In some embodiments, the number of qualified rows from the inner and outer table are based on the output of the table scan or index scan models. The output can be an estimated time. The input/training data for the second join model can include number of qualified rows from the outer table, the number of qualified rows of the inner table, a histogram of the join column, values of the predicates. The output can be an estimate of the qualified rows.

In some embodiments, an update and/or a delete command can include two models. A first model can be to scan the table for the relevant value. The second model can estimate the time to modify. The first model can be consistent with the number of qualified rows model for a table scan as described above. The inputs/training data for the second model can include the number of rows and the time. The output can be an estimated time.

In some embodiments, an insert command can include one model. The input/training data can include the number of qualified rows and the time to insert. The output can be a estimated time. In some embodiments, a separate model is use for a full-select insert and an array insert command.

In some embodiments, the models are unique for each query. The input data/training data changes based on the table, as it is unlikely that two table are identical. The exception to this is for sort models. Any sort model can be used across multiple queries.

At operation 510 query manager 431 estimates the execution time for the query. In some embodiments, the estimation time is a sum of all the times from each mini plan. In some embodiments, operation 510 includes retrieving database statistics and query data. It can also include sending the retrieved data through the model. The output can be a time for the total query. In some embodiments, if a query is included in the batch multiple times, the estimation can be multiplied by the number of instances of the relevant query. In some embodiments, the estimated time can be different for each instance of a similar query.

In some embodiments, operation 510 includes obtaining/retrieving the input data. The input data can be obtained from database statistics and/or run time data.

At operation 512 query manager 431 adds the estimated time to a total estimation. In some embodiments, the total estimated time is stored. If a query estimated time can be added to the total estimated time. For example, if the current estimation is for a fourth query, the fourth estimated time can be added to the total estimated time, which would include sum of the estimated time for a first query, a second query, and a third query.

At operation 514 query manager 431 determines if there are more queries in the batch to estimate. In some embodiments, there are more queries in the batch until an execution time is estimated for all queries. If there are additional queries (514:YES), then query manager 431 returns to operation 504. If there are no addition queries to estimate (514:NO) then query manager 431 proceeds to operation 516.

At operation 516 query manager 431 determines if there are query dependencies. In some embodiments, the query includes a dependency if a first query can modify a column that is subject to a predicate in a second query. For example, a first query can change set Column 1 as current value +5. A second query can select all values from column 1 where the value is greater than or equal to X. It becomes possible that the number of rows in column 1 that are greater than X can change based on the first query. In some embodiments, there is a query dependency if a query includes an if/else statement. In some embodiments, there is a query dependency if a query includes a loop statement.

If it is determined there is a dependency (516:YES), then query manager 431 proceeds to operation 518. If it is determined there is not a dependency (516:NO), then query manager 431 proceeds to operation 520.

At operation 518 query manager 431 updates the total time estimation. Operation 518 can include monitoring execution. The monitoring can include collecting run time statistics and monitoring for changes in the input data to the estimation. In some embodiments, includes real time adjustment of the estimated time. In some embodiments, the time can be updated after completion of each query. For example, if a first query includes loop, and the total execution time is less than the predicted execution time, then the time can be adjusted.

In some embodiments, for a dependent query (e.g., first query affect input of a second query) a model can be used to update the input/training data. The input/training data can include cardinality of the common column (or modified column), histogram of the common column and the predicate values. The output can include an updated histogram and/or updated input data for the second query. The estimated time for the modified column can then be passed through the model a second time. This can be consistent with the process in operations 506 to 516. The newly estimated times can then replace the previous estimated time for the same query and the total time can be updated.

At operation 520, query manager 431 outputs the estimated time. In some embodiments, the output is to a user. In some embodiments, the output includes the estimated time and/or and estimated completion time. In some embodiments, a notification (e.g., email, alarm, etc.) can be issued if the estimated time exceeds a threshold. The threshold can be a time limit (e.g., 6 hours), or if the estimated completion time goes past a predetermined finishing time (e.g., estimated completion time 8:15 A.M., predetermined finishing time 8:00 AM). In some embodiments, one or more queries can be removed from the batch in response to the estimated completion time exceeding the threshold.

In some embodiments, operation 520 includes executing the queries in the batch of queries. In response to executing each of the queries, the results can be returned to the source of the query. Executing the query can include performing each process/step in the access plan. In some embodiments, operation 520 includes returning the results of the query to the source of the query.

Figures 6A, 6B:
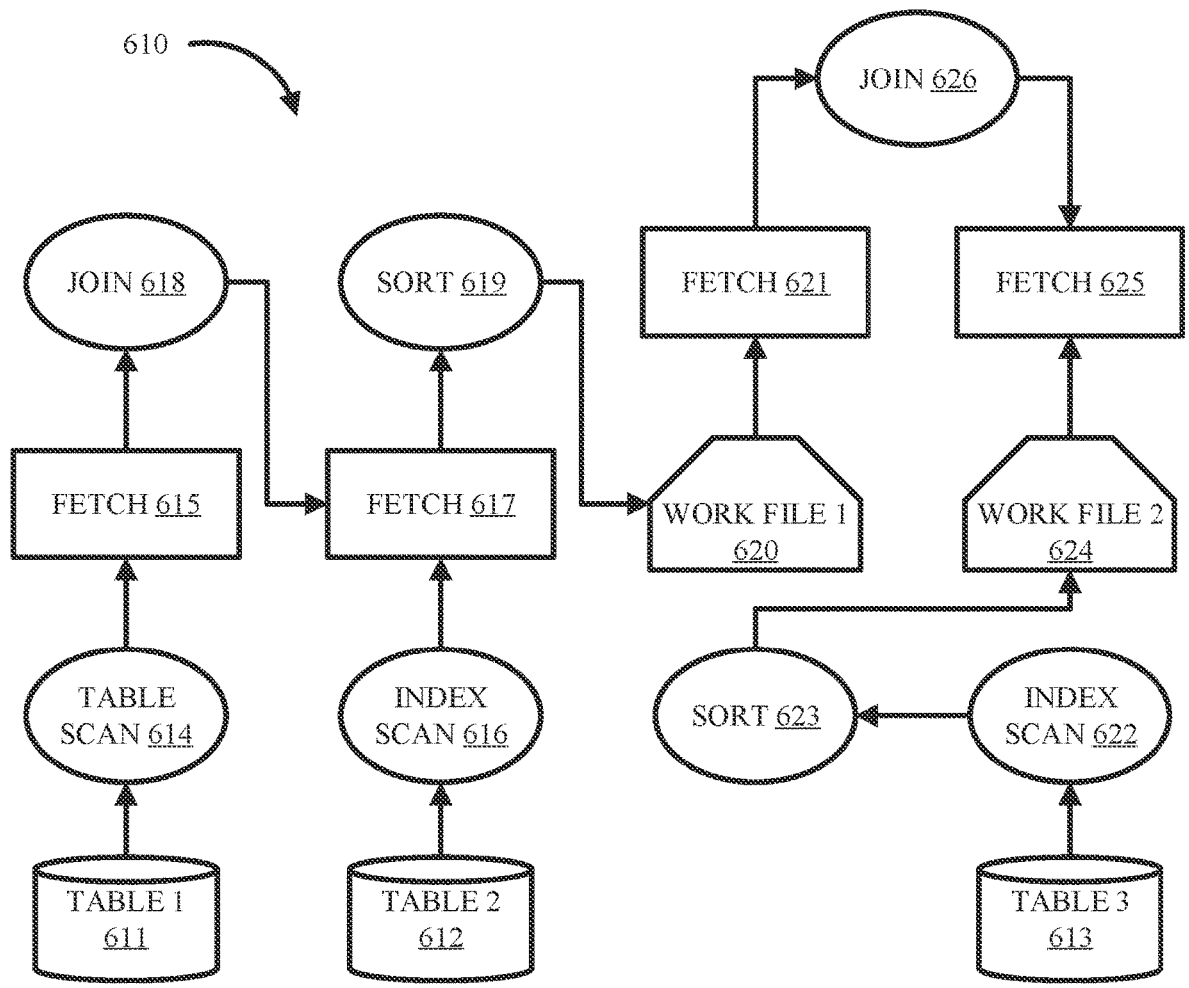
FIG. 6A is an example SQL query according to embodiments of the present disclosure.
FIG. 6B is an example access path for the SQL query according to embodiments of the present disclosure.
Figure 6C:
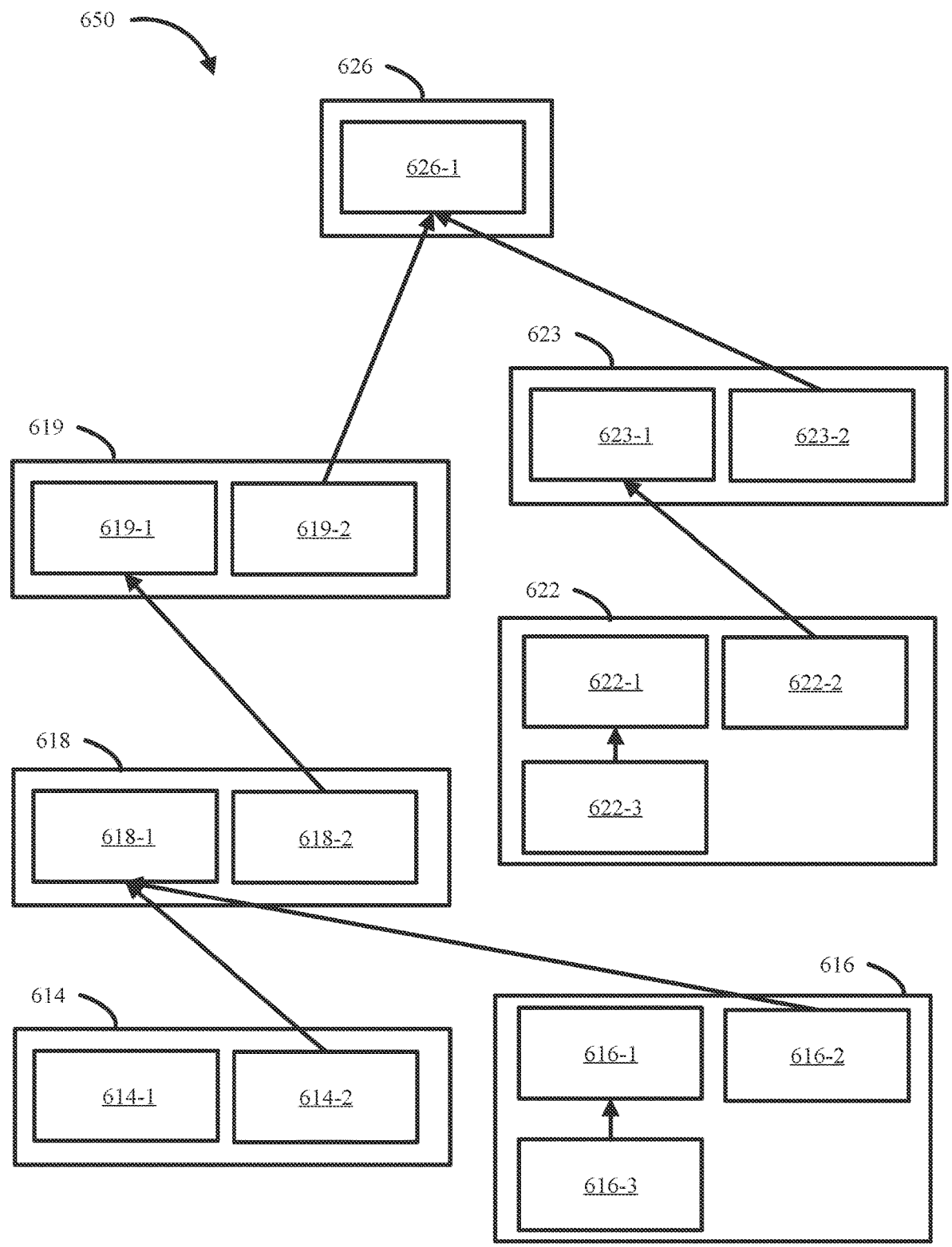
FIG. 6C is an example model tree for the SQL query according to embodiments of the present disclosure.

FIGS. 6A-6C includes one embodiment of how method 500 can be implemented. FIG. 6A includes an example query 600. Query 600 includes 3 tables (TAB) and five columns (C.1, C.2, . . . ) and 'EFG %' can represent a string. X, Y, Z, can be any variable.

FIG. 6B represents an access path 610 for query 600. The arrows can represent a data flow through access path 610. Access path 610 includes table 1 611, table 2 612, and table 3 613. A query manager can perform table scan 614 and fetch 615 on table 1 611. Query manager then performs an index scan 616 from table 612 and fetch 617 from index scan 616. Next query manager perform join 618 of the fetch 615 and fetch 617. Query manager may then sort 619 and covert to work file 1 620 and fetch 621 from work file 1 620. Query manager will index scan 622 from table 3 613, perform sort 623, then convert to working file 2 624 and fetch 625 from work file 2 624. Last, query manager will join the fetch 621 and fetch 625.

FIG. 6C displays a model tree 650. Model tree 650 includes table scan 614, index scan 616, join 618, sort 619, index scan 622, sort 623, and join 626. Each arrow represents the output of one model being inputted into a different learning model. Each number after the hyphen represents a type of model. -1 is time estimation, -2 is a estimate of qualified rows, and -3 index scanned row estimation.

The query manager will build model 614-1 estimate the time and 614-2 to estimate qualified rows from table 1. Model 616-3 will estimate the index rows scanned from table 2. The output of model 616-3 will be input into model 616-1 to estimate a time to scan the index. Model 616-2 will estimate qualified rows from table 2. The output of model 614-2 and 616-2 will be input in model 618-1 and the output will be a time to complete the join command. Next model 618-2 will estimate the number of qualified rows that result from the join. The output from 618-2 will be input into model 619-1. The output of model 619-1 will be a time to sort the joined tables.

Next the query manager will estimate the scanned index rows at 622-3. The output of 622-3 will be input into model 622-1 to estimate a time to perform the index scan 622. Model 622-2 will then estimate a number of qualified rows from table 3 613. The output of model 622-2 will be input in model 623-1 and model 623-1 will estimate a time to sort. In some embodiments, model 619-1 and 623-1 can be the same model, they will just receive different input based on their location in the access path. Next model 623-2 will determine the number of qualified rows from sort 623. The output of model 623-2 and the output of model 619-1 into model 626-1. Model 626-1 can output the estimated time of join 626. Finally, the query manager can sum all of the time output models, 614-1, 616-1, 618-1, 619-1, 622-1, 623-2, and 626-1 to determine an total time estimate to execute this query. The total time can be multiplied by the number of instances the query will be processed and/or added to the time estimates for different queries in the query batch.

In some embodiments, each model in model tree 650 can be nested together to form a single nested layer model. Model tree 650 can be an outline of the nested layers and their interactions. Additionally, for each model, the inputs can include data beyond the output of the other models depicted. FIG. 6C depicts how the models can be connected/nested to determine an overall time. It should not be considered limiting in any way.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a batch of queries, wherein the batch of queries includes a plurality of queries and each query of the plurality of queries is configured to retrieve data from a database;
   selecting a first query of the plurality of queries;
   generating an access path for the first query including one or more mini plans;
   building a machine learning model, wherein the building includes stacking a mini model for each of the one or more mini plans, and the stacking is based on a location within the access path for each mini plan;
   estimating, by the machine learning model for each of the one or more mini plans, an estimated execution time for each of the one or more mini plans;
   adding each of the estimated execution times for each of the one or more mini plans to determine a first total estimated time for the first query; and
   displaying the first total estimated time; and
   executing the batch of queries.

2. The method of claim 1, wherein each mini plan is correlated to a command in the first query.

3. The method of claim 2, wherein a first mini plan is correlated to a table scan command, and includes a first mini model configured to estimate a first time to scan a first table and a second mini model configured to estimate a first number of qualified rows to return.

4. The method of claim 2, wherein a second mini plan is correlated to an index scan command, and includes a third mini model configured to estimate a third time to scan a third index for a third table, a fourth mini model configured to estimate a fourth number of qualified rows to return, and a fifth mini model configured to estimate a fifth number of rows to be scanned in the third index.

5. The method of claim 4, wherein the fifth number of rows to be scanned in the index is an input into the third mini model.

6. The method of claim 2, wherein a third mini plan is correlated to a join command, and includes a sixth mini model configured to estimate a sixth time to perform the join command and a seventh mini model configured to estimate a seventh number of qualified rows after the join command.

7. The method of claim 2, wherein a fourth mini plan is correlated to a sort command, and includes an eight mini model configured to estimate a first time to complete the sort command.

8. The method of claim 1, wherein the learning model is a nested layer learning model.

9. The method of claim 1 further comprising:
   training, by training data, each learning model of the one or more mini plans.

10. The method of claim 1, further comprising:
    building a second learning model for a second query;
    determining a second query total execution time, wherein the second query total execution time is based on a second input of the second learning model;
    calculating an overall execution time by adding the first query total execution to the second query total execution time; and
    displaying the overall execution time.

11. The method of claim 10, further comprising:
    determining the second query is dependent on the first query, wherein the second input is altered based on the dependency;
    updating the second input;
    adjusting the second query total execution time in response to updating the second input; and
    updating, in response to the adjusting the second query total execution time, the overall execution time.

12. A system comprising:
    a processor; and
    a computer-readable storage medium communicatively coupled to the processor and storing program instructions which, when executed by the processor, are configured to cause the processor to:
    identify a batch of queries, wherein the batch of queries includes a plurality of queries and each query of the plurality of queries is configured to retrieve data from a database;
    select a first query of the plurality of queries;
    generate an access path for the first query including one or more mini plans;
    build a machine learning model, wherein the building includes stacking a mini model for each of the one or more mini plans, and the stacking is based on a location within the access path for each mini plan;
    estimating, by the machine learning model for each of the one or more mini plans, an estimated execution time for each of the one or more mini plans;

add each of the estimated execution times for each of the one or more mini plans to determine a first total estimated time for the first query; and display the first total estimated time.

13. The system of claim 12, wherein the program instructions are further configured to cause the processor to:

create, based on the access path a model tree, wherein each node in the model tree is correlated to one of the one or more mini plans, and each node, includes a first mini model configured to estimate a time to execute each mini plan.

14. The system of claim 13, wherein a first mini plan includes a second mini model configured to estimate a number of qualified rows, and an output of the second mini plan is an input into the first mini model of a second mini plan.

15. The system of claim 14, wherein the program instructions are further configured to cause the processor to:

stack the first mini model of the second mini plan onto the first mini model of the first mini plan and onto the second mini model of the first mini plan.

16. A computer program product, the computer program product comprising a computer readable storage medium having program instructions embodied therewith, the program instructions executable by a processing unit to cause the processing unit to:

identify a batch of queries, wherein the batch of queries includes a plurality of queries and each query of the plurality of queries is configured to retrieve data from a database;

select a first query of the plurality of queries;

generate an access path for the first query including one or more mini plans;

build a machine learning model, wherein the building includes stacking a mini model for each of the one or more mini plans, and the stacking is based on a location within the access path for each mini plan;

estimating, by the machine learning model for each of the one or more mini plans, an estimated execution time for each of the one or more mini plans;

add each of the estimated execution times for each of the one or more mini plans to determine a first total estimated time for the first query; and display the first total estimated time.

17. The computer program product of claim 16, wherein the program instructions are further configured to cause the processing unit to:

create, based on the access path a model tree, wherein each node in the model tree is correlated to one of the one or more mini plans, and each node, includes a first mini model configured to estimate a time to execute each mini plan.

18. The computer program product of claim 17, wherein a first mini plan includes a second mini model configured to estimate a number of qualified rows, and an output of the second mini plan is an input into the first mini model of a second mini plan.

19. The computer program product of claim 18, wherein the program instructions are further configured to cause the processing unit to:

stack the first mini model of the second mini plan onto the first mini model of the first mini plan and onto the second mini model of the first mini plan.

* * * * *